July 11, 1944.     W. C. RUDD     2,353,362
EXTRUSION MOLDING APPARATUS
Filed Oct. 22, 1943     2 Sheets-Sheet 1

INVENTOR.
WALLACE C. RUDD.
Ward, Crosby & Neal
ATTORNEYS.

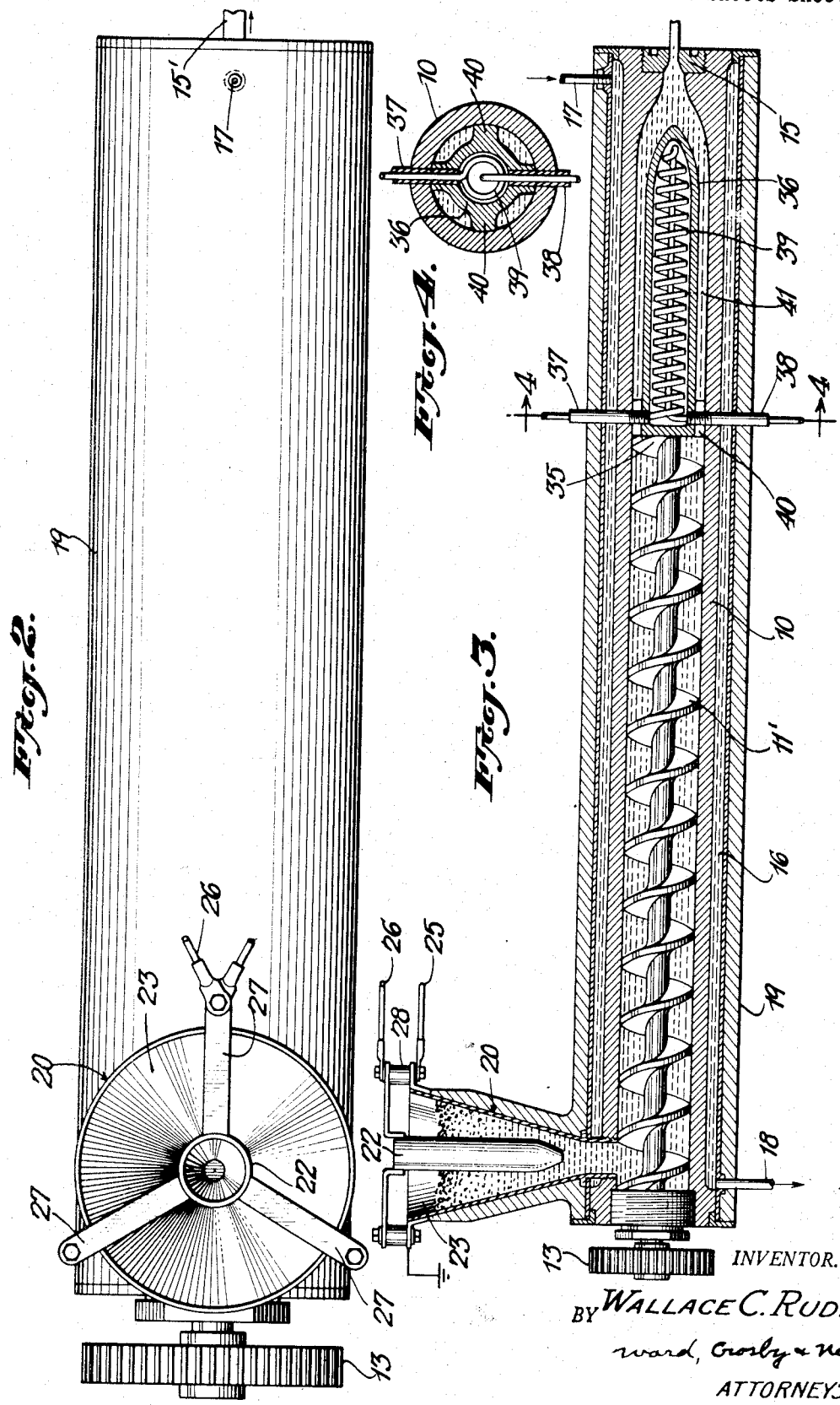

Patented July 11, 1944

2,353,362

UNITED STATES PATENT OFFICE 2,353,362

EXTRUSION MOLDING APPARATUS

Wallace C. Rudd, Yonkers, N. Y., assignor to Induction Heating Corp., New York, N. Y., a corporation of New York Application October 22, 1943, Serial No. 507,239

1 Claim. (Cl. 18—12)

This invention relates to apparatus for molding plastic materials of the various types adapted to be molded upon heating. Among other possible uses the invention is adapted for the rapid molding of thermoplastics and thermosetting plastics by extrusion methods.

Heretofore it has been the general practice with extrusion molding apparatus to introduce the plastic material in divided solid form into the extruding machine, and to heat the material up to extrusion temperature while it is being fed through the machine, such heating being accomplished by conduction of heat through the walls of the machine, from streams of hot fluid circulating through the walls. With this method of heating, considerable time is required for the heat to penetrate to the proper degree throughout the supply of plastic material, and unless the operation is conducted relatively slowly, portions of the plastic material which happen to remain remote from the heated walls of the apparatus, may not reach the proper extrusion temperature. Oftentimes the heating will not be uniform throughout the mass as supplied to the extrusion die. As a consequence, the plasticity of the material may vary, with the result that the extrusion effect may not be uniform, and the product may be irregular in character and dimensions.

It is of course well known that dielectric materials, such as plastics, may be rapidly heated internally by subjecting same to a high frequency electrostatic field established between high voltage electrodes. However, due to the pressures occurring in extrusion apparatus and the consequent difficulty of providing suitably insulated high voltage electrodes therein, it has not so far as I am aware, heretofore been proposed or considered practicable to use such a method of heating for extrusion molding purposes. The present invention, however, provides simple and dependable methods and apparatus, making it possible to dielectrically heat uniformly and throughout, the supplies of plastic material, in conjunction with extrusion molding operations, and with the result that the extrusion apparatus may be operated several times faster than heretofore, while insuring a more uniform product.

Various further and more specific objects, features and advantages of the invention will more clearly appear from the detailed description given below taken in connection with the accompanying drawings which form a part of this specification and illustrate merely by way of example preferred forms of the invention. The invention consists in such novel features, arrangements and combinations of parts as may be shown and described in connection with the apparatus herein disclosed, and also such novel methods as are disclosed and described hereinafter.

In the drawings,

Fig. 2 is a top view of the apparatus of Fig. 1;

Fig. 3 is a vertical sectional view of another form of the apparatus; and

Fig. 4 is a sectional view taken substantially along line 4—4 of Fig. 3.

Figure 1:
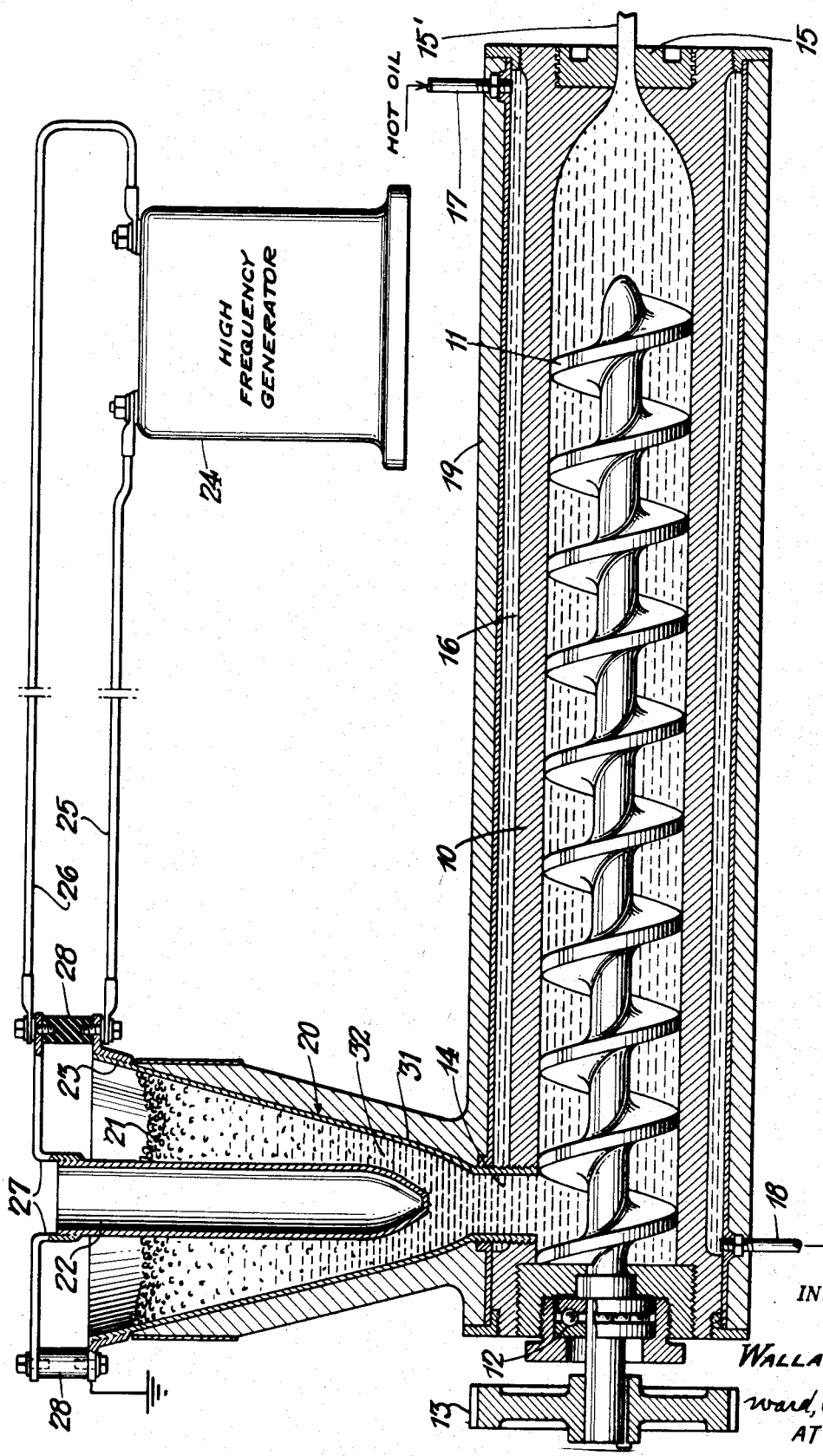
Fig. 1 is a vertical sectional view of one form of extrusion molding apparatus embodying the invention.

With the form of extrusion apparatus shown in Fig. 1, the main body portion may be the same or similar to that of apparatus heretofore used for extrusion molding. For example, a cylinder may be provided as at 10 for receiving a rotatable extruding screw member 11. This member may be rotatably mounted at one end within suitable ball bearing means as at 12, a drive gear being provided as at 13. The inlet for the plastic material may be formed as at 14 near the head end of the screw member, the screw member serving to force the plastic material out through an extruding die as at 15, located at the other end of the machine. Rods, tubes, strips, etc., as at 15' may be formed, depending upon the shape of the die aperture. As with the practice heretofore, the cylinder 10 may be surrounded by a circulating fluid cavity as at 16, having inlet and outlet connections as at 17 and 18 for a supply of hot oil, for example. The apparatus may be covered with a layer of suitable insulation as at 19.

According to the present invention, the apparatus is provided with a hopper as at 20, discharging into the inlet 14. Provision is made in this hopper for subjecting the entering plastic material as at 21, to a high frequency electrostatic field maintained between a central electrode 22 and an outer surrounding electrode 23, the latter preferably comprising the hopper walls or being in the form of conductive members included in such walls. A suitable source of high frequency current is diagrammatically indicated at 24, with connections as at 25, 26 running to the electrodes. In the example shown, the hopper 20 and hence also its connection 25 may be grounded. The electrode 22 on the other hand, may be mounted on brackets as at 27, each supported on insulation posts as at 28. In the example of Figs. 1 and 2, three of the brackets 27 are provided, one of same being attached to the connection 26 from the high frequency generator.

The electrode 22 in the particular form shown, may comprise a hollow member of conductive material, the main body portion of which is generally cylindrical and the lower end of which may be inwardly tapered as at 30. The electrode 23 in the particular example shown, itself comprises the walls of the hopper, which is of an inverted conical shape, having a lower end portion as at 31 with walls tapered inwardly at about the same angle as the restricted portion at the lower end of electrode 22. Thus a relatively narrow annular space is provided at 32, extending uniformly about the lower end of the electrode 22. The plastic material after being softened or partially melted at higher elevations, settles down uniformly into the space 32 and is here subjected to an intense electrostatic field for uniform heating throughout, before admission to the screw chamber. Preferably for most rapid operation of the apparatus, the plastic material should be heated to its fusing temperature and to a temperature suitable for extruding before it enters the screw chamber. In that event the heat supplied by conduction through the walls of the chamber need only be sufficient to maintain such temperature in the material until it reaches the die member. If the chamber 10 is well insulated and made as short as possible, heating thereof may be dispensed with, at least after the apparatus has been brought into full operation.

The form of the apparatus as shown in Fig. 3 is similar to that of Fig. 1 except that the forward end of the screw member 11' terminates as shown at 35, at a point spaced substantially from the die. Also in the space between the end of the screw member and the die, an internally heated core member 36 is provided. This core member may be also heated by a stream of oil passing through inlet and outlet connections as at 37, 38 and through an internal heating coil 39. If preferred, the coil 39 may be in the form of an electrical resistance heater supplied with current connections passing through pipes 37 and 38. The core member 38 may be supported as by webs 40 in a position concentric with the chamber 10 so that an annular space as at 41 is provided through which the plastic material passes as a relatively thin annular layer on its way to the die 15. Since this thin annular layer of moving material is subjected to heat both externally and internally, this form of the apparatus is well adapted for careful control of the temperature of the material and final heating thereof just before it passes through the die.

If desired, the material may be heated dielectrically up to a temperature somewhat below the desired extruding temperature and then the temperature may be raised to the desired level for molding as the material passes through the annular space 41.

Since either all, or a greater part of the heat required to raise the plastic material up to extruding temperature may be applied dielectrically before the material is introduced into the screw chamber, it will be possible to materially reduce the length of such chamber as compared with types heretofore used, wherein all of the heat had to be applied in the chamber.

It will be apparent that the above described dielectric heating apparatus may be applied to existing types of extruding machines. In that event the speed at which the machine is operated may be increased some three-fold and with assurance of a more uniform product.

Heretofore it has been the general practice to use extrusion molding only with thermoplastic materials, as distinguished from thermosetting plastics. Since with the prior practice, considerable time is required to heat the material up to extrusion temperature, it was necessary to operate the machine at a relatively slow speed with consequent danger, if thermosetting material were used, that the material would become set in the machine and thus clog it against further possibility of operation. On the other hand, with the present invention, since the plastic material may be heated rapidly and uniformly throughout, the time required for its travel through the machine may be so short as to safely permit the use of thermosetting plastics without danger of clogging the machine. In case thermosetting material is used, just before it is desired to stop the machine for any purpose, a quantity of thermoplastic material may be introduced so as to displace all of the thermosetting material before the machine stops. Thus the danger of clogging the machine through setting of any of the material therein may be avoided. The thermoplastic material remaining in the machine may of course be softened at any time by applying heat as from the circulating oil, so that the machine will then be free to be started again, and as soon as it reaches normal operating speed, it may be thereafter supplied with thermosetting material until just before shutting down.

The amount of high frequency power required will of course depend upon the capacity of the machine and its speed of operation. In a typical test of the invention, cellulose acetate plastic material was used in a form available in small pellets under the trade name "Tenite." These pellets were poured into the hopper while the electrodes were connected to a 12 kilowatt high frequency generator. The frequency of the generator may for example vary from 13 to 30 megacycles and the electrode potential from 5,000 to 10,000 volts. The feed should be at such a rate that with cellulose acetate plastics, for example, and with the particular generator used, the plastic material will be heated to temperatures of from 250 to 350° F. as it leaves the hopper.

While the invention has been described in detail with respect to certain preferred examples, it will be understood by those skilled in the art after understanding the invention, that various changes and further modifications may be made without departing from the spirit and scope of the invention, and it is intended therefore in the appended claim to cover all such changes and modifications.

What is claimed as new and desired to be secured by Letters Patent is:

In combination with apparatus for extrusion molding of plastic material, an inlet hopper for the apparatus formed of an inverted generally conical shape, an electrode of substantially circular cross section suspended substantially coaxially within said hopper and insulated from the hopper walls, the lower end of said electrode being positioned just above the throat of the hopper and being tapered at an angle to provide approximately uniform spacing between such lower end and the adjacent portions of the hopper walls, the spacing between the higher portions of the electrode and the hopper walls progressively increasing upwardly, said walls including conductive material comprising another electrode substantially symmetrically arranged around said suspended electrode, and a high frequency source of power connected to said electrodes for maintaining an electrostatic field therebetween to dielectrically heat the plastic material as it enters the apparatus through the hopper.

WALLACE C. RUDD.